United States Patent Office 2,757,571
Patented Aug. 7, 1956

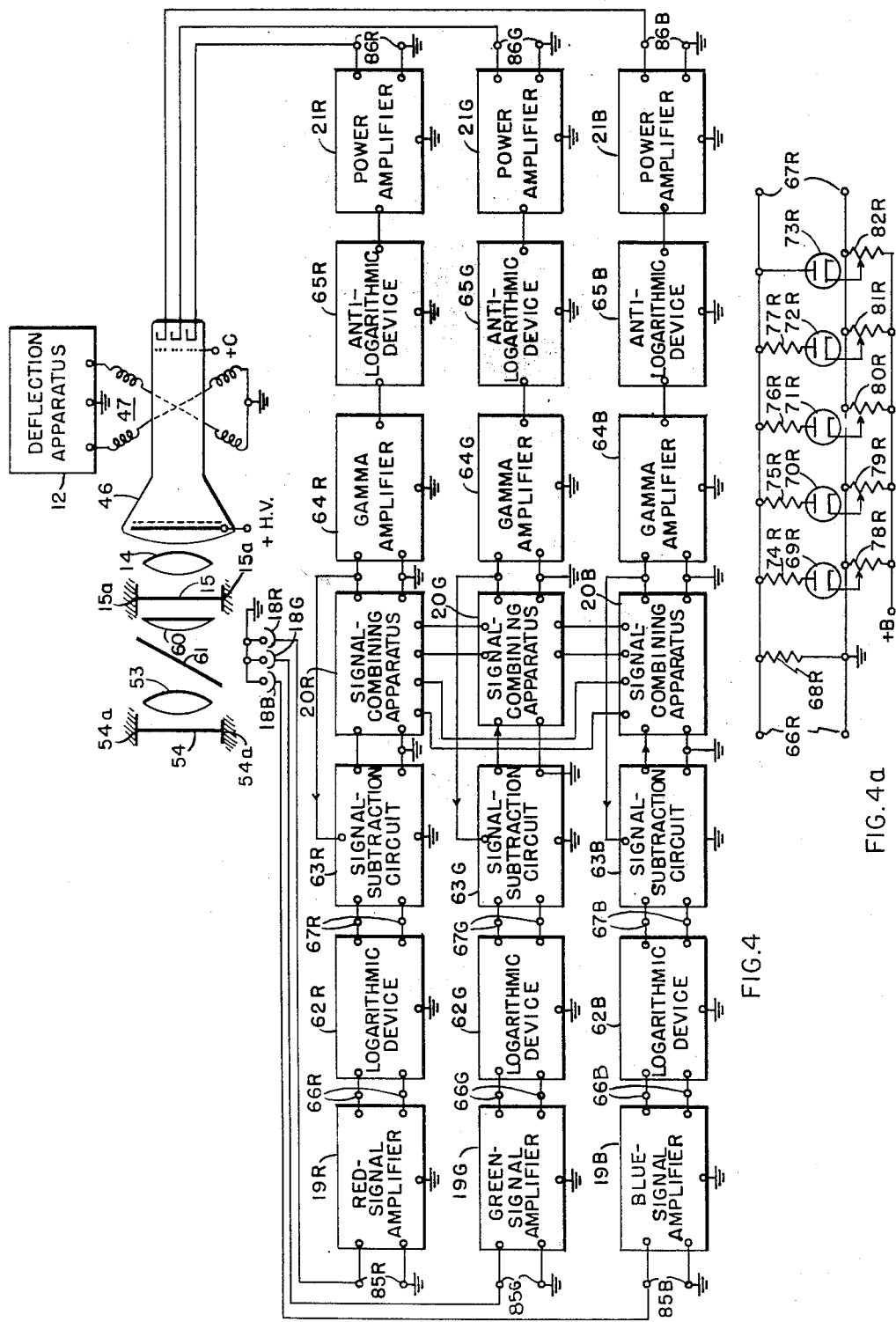

2,757,571

PHOTOGRAPHIC COLOR PRINTER

Arthur V. Loughren, Great Neck, N. Y., assignor to Hazeltine Research, Inc., Chicago, Ill., a corporation of Illinois Application September 15, 1953, Serial No. 380,238

17 Claims. (Cl. 88—24)

GENERAL

The present invention relates, in general, to a printer for developing photographic color reproductions and, more particularly, to a printer for use in photographic processes which employ single composite color negatives, color-separation negatives, or a process which directly duplicates transparencies to develop such reproductions.

In the present state of the photographic art, it is not difficult to develop original color transparencies relatively inexpensively, and only a little more difficult and expensive to process original color prints. However, secondary color prints and transparencies reproduced from such primary transparencies or from original color prints are obtainable only at relatively great expense, if such secondary prints are to have the quality of the originals, due to the need for tedious and time-consuming efforts to correct dye deficiencies and other undesirable factors in the original medium and process. These deficiencies and other factors cause increasingly greater color errors as the sources for the reproductions become more remote from the original prints and transparencies.

In one form of conventional process for developing color reproductions from, for example, a color transparency, a light preferably of uniform brightness and color over the area of a transparency is directed onto the transparency. The color and brightness of the light passing through the transparency and emerging from each elemental area thereof varies in a manner wholly determined by the color absorption characteristic and the density of the transparency or degree of opaqueness of the dyes in each elemental area, such density being determined by the concentrations of the color dyes deposited in such elemental areas. Theoretically, in a trichromatic or three color process, the three dyes in the transparency for causing optical sensations in terms of the three primary colors, for example, in terms of the colors green, red, and blue should have different, nonoverlapping optical transmission characteristics. In other words, for example, the dye for controlling the sensation of blue should effect such sensation without disturbing the sensations of red and green, individually caused by different ones of the other two dyes. Also, the latter two dyes should, individually, cause their optical sensations in a manner similar to that for the dye causing the sensation of blue. More specifically, such dyes should have narrow light-absorption bands corresponding to the color band each is intended to represent in the reproduction. No two of such absorption bands should overlap and there should be no gaps between such bands. Stated in another way, there should be no cross-coupling effects caused by the dyes. However, in practice, such spectral absorption bands do overlap, causing the dye for any one primary color also to affect at least one other primary color. When such overlapping is extreme, color errors occur in the light emerging from the transparency and appear in any print or any other transparency reproduced by means of such emerging light. The manner in which such color errors occur will become more understandable by considering some details of one form of reproduction process.

In one process for developing positive color prints or transparencies from an original transparency, color-separation negatives are conventionally developed in an intermediate step. That is, a negative is prepared for each of the primary colors emitted from the transparency, one representative of, for example, red light, one of green light, and one of blue light transmitted through the transparency. These color-separation negatives are then utilized to reproduce the desired number of positive color prints or other transparencies. However, for the reasons set forth above, these color-separation negatives normally do not completely satisfy the spectral requirements for trichromatic color reproduction. For example, consider the magenta color image formed by the imposition of green light upon the sensitive materials of the original film. This magenta image in the resultant transparency should completely transmit the blue and red components of a white light while absorbing the green component thereof. However, due to the wide absorption band of the dye which comprises such magenta image, a relatively large amount of the blue component of the light source is absorbed by the magenta image instead of being transmitted and, thus, such magenta image actually superimposes a pattern of the green photographic densities in the transparency upon the blue separation negative prepared from the blue light emerging from the transparency. As a result, the blue separation negative does not truly represent the blue in the scene. In a similar manner, that part of the transparency which represents a record of the red light in the recorded scene and which should, therefore, transmit the blue and green lights while absorbing only the red light actually absorbs some of both the blue and green lights resulting in further lack of fidelity in the separation negatives representative of the blue and green lights of the image. To a lesser degree, the yellow image in the transparency undesirably absorbs some green light, thereby further disturbing the quality of the green separation negative.

Knowing the deficiencies of the dyes in the transparency and assuming that all other factors do not contribute to the color error or, at least, contribute equal errors in all colors, it is possible to compensate for the deficiencies of such dyes by a technique known as masking. This technique, for example, consists in modifying the characteristics of the original transparency in both brightness and color by means of a plurality of transparent overlays individually in register with the transparency while preparing different ones of the separation negatives, that is, masks so that such light emerges from the original transparency and falls upon the sensitized material as to permit another transparency or a color print which faithfully represents the original scene to be developed therefrom. More specifically, it is possible to develop a masking negative representing the pattern of the magenta dye in the transparency image equal in intensity to the degree to which the magenta dye absorbs blue light but opposite in character. Such a masking negative would be employed in register with the yellow dye image to compensate for the blue light absorbed by the magenta image in the transparency. In a similar manner, the yellow dye image can be corrected to compensate for the blue absorption of the cyan dye. In effect, masking is a technique by which effectively the density of a dye representing a given color is controlled by its own color-separation negative in register with a thin density negative or positive derived from the separation negative for at least one of the other primary colors. For perfect correction, at least in theory, a total of nine overlays or masks would be required in trichromatic color reproduction. In practice, both due to the expense of developing such a large number of masks and due to the small magnitudes of the errors produced by the deficiencies in some of the color dyes, photographers have found that one or two masks produce a substantial improvement in the color-duplicating process resulting in acceptable reproductions.

However, the utilization of even two masks greatly increases the expense of color reproduction and creates problems of obtaining masks which are properly balanced in density with respect to each other and with respect to the separation negatives. It is, therefore, desirable to develop color reproductions without the utilization of such physical masks.

If the light from the uniform light source previously mentioned and incident on the transparency, instead of being white and unmodulated in intensity over the spectral range, is caused to vary both in intensity and color from point to point, that is, spatially, as a pencil of such light traces a pattern on the transparency and such variation in intensity and color is made complementary to the error or errors known to be associated with a given density of color or a given dye in the transparency, the light source then effectively is modulated as if by a color mask of the type which would be formed from a composite of the masks previously described in such manner as to be capable of correcting for the errors of the transparency. The same virtual mask which is effectively imposed in the path of the light source may also be such as simultaneously to compensate to a large degree for known reproduction deficiencies of the material on which the print is being made, for example, for underexposure, for lack of adequate contrast, for distortions of photographic density values due to the peculiar characteristics of the photographic emulsions employed, and for many other deficiencies in the original transparency. This self-masking light source is producible by electronic, specifically, color-television techniques by utilizing as the light source the elemental areas of tricolor light emitted from a phosphor excited by a cathode-ray beam such as in a cathode-ray tube.

It is an object of the present invention, therefore, to provide a photographic color printer which avoids the aforementioned deficiencies and limitations of prior color-printing apparatus and techniques.

It is also an object of the present invention to provide a photographic color printer which is simple in construction and operation.

It is additionally an object of the present invention to provide a photographic color printer which is capable of economically and inexpensively developing desirable color reproductions from an original color print.

It is a further object of the present invention to provide a photographic color printer which is capable of reproducing color prints with results superior to those of prior printing processes and techniques.

It is a still further object of the present invention to provide a photographic color printer which is capable of automatically correcting for brightness and color errors in an original print.

In accordance with the invention, there is provided a photographic color printer useful in a photographic process having color light-transmission characteristics substantially definable by a plurality of mathematical functions for reproducing on light-sensitive material from one color reproduction of a scene other color reproductions thereof. The printer comprises a source of light of composite color for illuminating the one reproduction to develop therefrom a resultant light of composite color which represents the aforesaid scene but tends to deviate from a desired representation thereof by a degree determinable by means of the aforementioned mathematical functions. The printer also comprises a computer including electro-optical transducer apparatus responsive to the resultant light for substantially simultaneously developing therefrom a plurality of electrical signals individually representative of different component colors thereof and including a plurality of signal-translating channels individually having signal transfer characteristics determined by individual ones of the aforesaid mathematical functions for substantially simultaneously translating in individual ones of the channels different ones of the electrical signals and deriving therefrom electrical correction signals representative of the light correction needed in the photographic process to develop the other color reproductions so that they desirably represent the aforesaid scene. Finally, the color printer comprises utilization apparatus coupled to the aforementioned computer for employing the correction signals to effect such illumination of light-sensitive material that the other reproductions developed therefrom desirably represent the scene.

For a better understanding of the present invention, together with other and further objects thereof, reference is had to the following description taken in connection with the accompanying drawings, and its scope will be pointed out in the appended claims.

Referring to the drawings.

Figure 1:
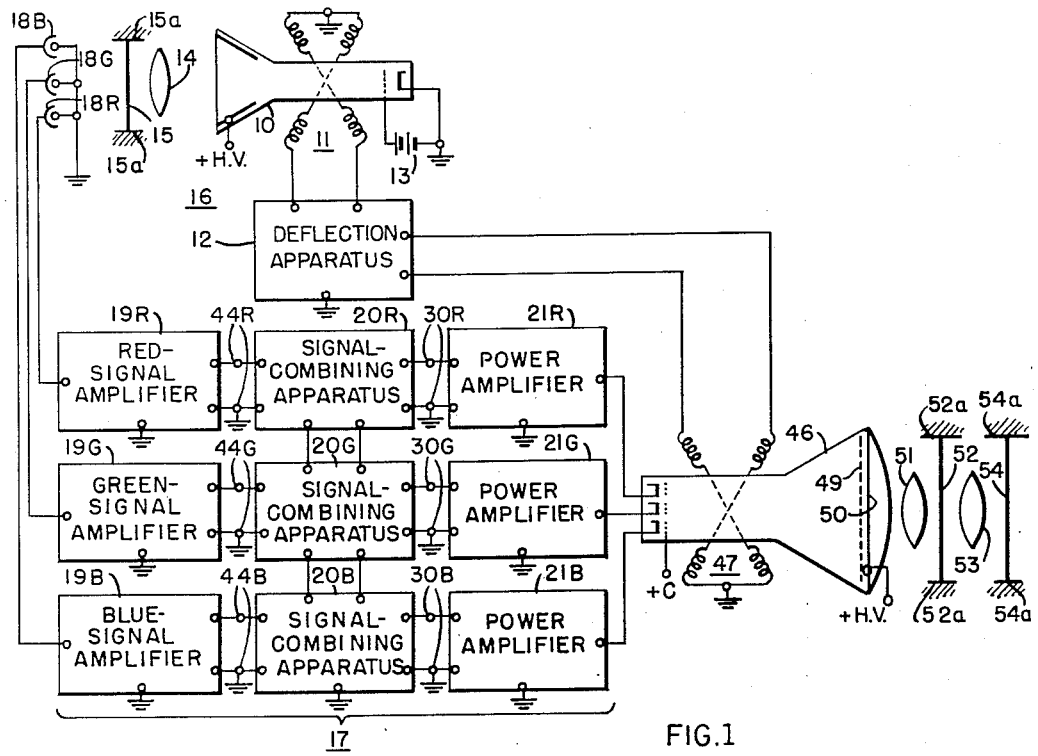
Fig. 1 is a schematic diagram of a color printer in accordance with the present invention.
Figure 2A:
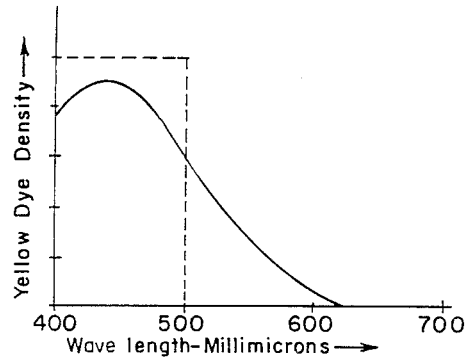
Figure 3A:
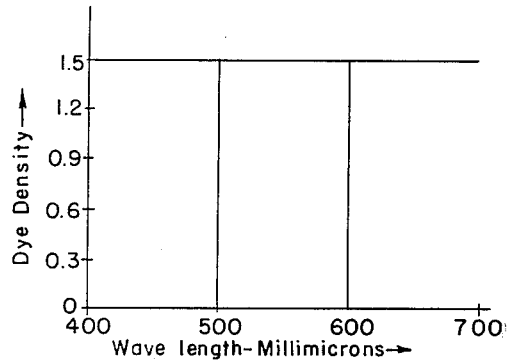
Figure 2B:
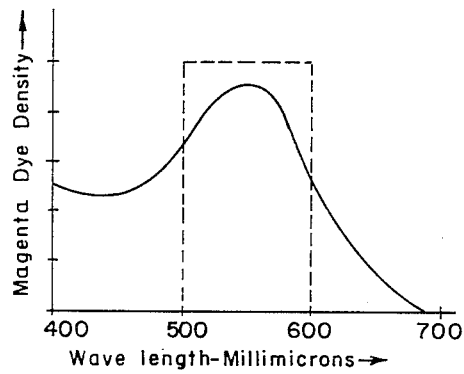
Figure 3B:
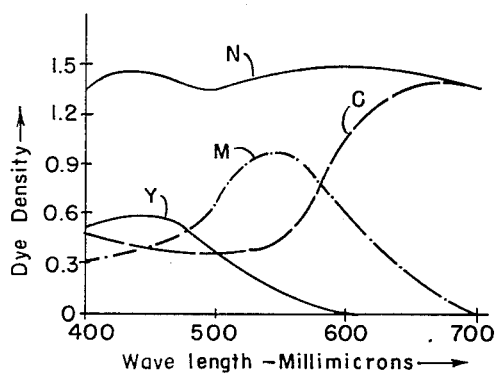
Figure 2C:
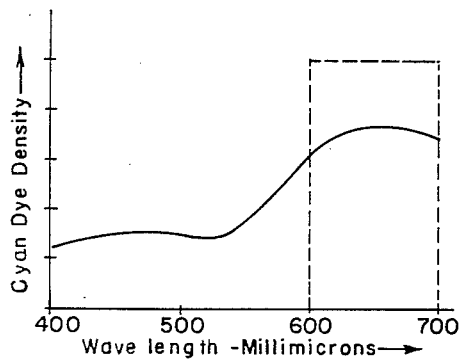
Figure 3C:
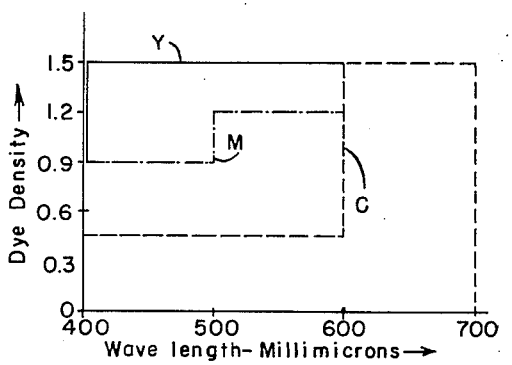

Figs. 2a, 2b, and 2c are graphs useful in explaining the operation of the printer of Fig. 1;

Figs. 3a, 3b, and 3c are composite graphs useful in explaining the operation of the printer of Fig. 1;

Fig. 4 is a schematic diagram of another embodiment of a photographic color printer in accordance with the invention;

Fig. 4a is a circuit diagram of components of Fig. 4, and

Figure 5:
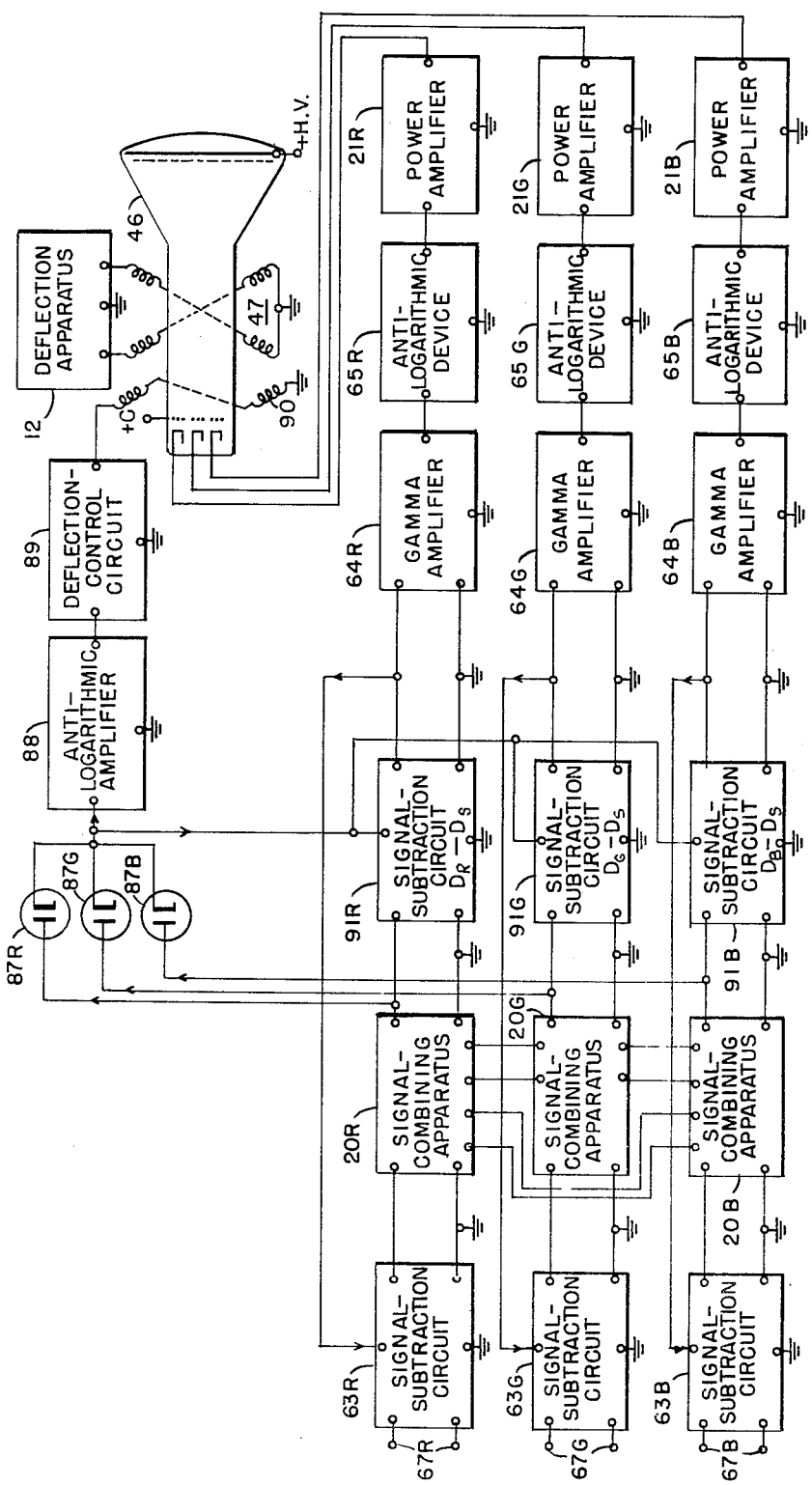

Fig. 5 is a schematic diagram of a modified form of a portion of the printers of Figs. 1 and 4.

DESCRIPTION OF PRINTER OF FIG. 1

Referring now to Fig. 1 of the drawings, the printer there represented is a photographic color printer for a photographic process having color light-transmission characteristics substantially definable by a plurality of mathematical functions, more specifically, being a printer for a process in which the dyes have overlapping spectral responses resulting in color contamination. As will be described more fully hereinafter, such overlapping responses can be defined by a plurality of mathematical equations. The color printer of Fig. 1 is an improvement over prior such printers in that it is effective to reproduce from one color reproduction of a scene other color reproductions desirably representing the scene. In other words, the printer of Fig. 1 is effective to correct for the color contamination caused by the improper light-transmission characteristics of the dyes employed in the process.

The printer of Fig. 1 comprises a source of light of composite color, that is, light comprising more than one primary color for illuminating the one reproduction to develop therefrom a resultant light of composite color which represents the scene and which tends to deviate from the desired representation thereof by a degree determinable by means of the aforementioned mathematical functions. More specifically, the source of light is a conventional flying-spot scanner tube 10 such as is regularly utilized in television transmitters. To effect scanning, the tube comprises the conventional electrodes including a cathode and control-electrode circuit coupled to a source of potential such as a battery 13 for developing an electron beam and directing such beam to an anode connected to a source of positive high voltage and horizontal and vertical deflection windings 11 coupled to deflection apparatus 12 for causing the beam to be deflected as it flows from the cathode to the image screen of the tube. The energization of the anode, cathode, and control-electrode circuits of the tube 10 may be effected by a number of conventional circuits and the deflection apparatus 12 may be any of a number of types utilized in conventional television receivers or transmitters for a similar purpose. The source of light also includes a focusing lens 14 for optically coupling the scanning spot of light on the image screen of the tube 10 to the surface of a color transparency 15. The transparency 15 is supported by members 15a, 15a and comprises one color reproduction of a desired scene and the light transmitted through such transparency comprises a resultant light of composite color which represents the scene on the transparency 15 and which tends to deviate from the desired representation thereof by a degree determinable by means of the aforementioned mathematical equations. Though the light source just described includes a conventional flying-spot scanner for developing substantially white light or, in other words, light of a composite color, it should be understood that different types of light source and scanning techniques may be employed. For example, if low scanning speeds are acceptable for the color process being employed, conventional arc lamps in combination with a well-known type of Nipkow disc may be employed.

The photographic color printer of Fig. 1 also includes a computer 17 including electro-optical transducer apparatus comprising electro-optical transducer devices, specifically, photocells 18B, 18G, and 18R responsive to the resultant light for developing therefrom a plurality of electrical signals individually representative of different component colors of the resultant light. The cells 18B, 18G, and 18R have such spectral characteristics as to be individually responsive to respective ones of lights of the primary colors blue, green, and red. Preferably, the spectral characteristics of the cells 18B, 18G, and 18R should be such that their spectral responses do not overlap in the visual spectrum. The responses of such cells may be restricted to relatively narrow bands. If there is any overlapping of the responses of the cells 18B, 18G, and 18R, compensation for such may be made in the computer to minimize its effect in the reproduction process. The manner of effecting such compensation will be considered more fully hereinafter. One electrode of each photocell is connected to ground or, in other words, one terminal of a potential supply source, while the other electrodes of the cells 18B, 18G, and 18R are coupled, respectively, to input circuits of a group of amplifiers 19B, 19G, and 19R. The suffixes B, G, and R are employed with respect to the above-mentioned tubes and amplifiers and also hereinafter with respect to other units of the computer 17 to indicate the one of the primary colors blue, green, and red, respectively, to which a unit so identified is responsive. Furthermore, with respect to the utilization herein of a particular set of primary colors, it should be understood that, depending upon the type of printing process employed, different sets of primary colors may be utilized.

The computer also includes a plurality of signal-translating channels individually having signal transfer characteristics determined by different ones of the aforesaid mathematical functions for substantially simultaneously translating individually through different ones of such channels different ones of the aforementioned electrical signals. There are derived from such translated signals electrical correction signals representative of the light correction desired in the photographic process for illuminating light-sensitive material so that other color reproductions which desirably represent the scene may be developed from such material. These channels comprise three parallel paths each including, in cascade, an amplifier, a signal-combining apparatus, and a power amplifier for individually translating different ones of the signals representative of the red, green, and blue components of the resultant light translated through the transparency 15. Corresponding units in these channels are designated by the same reference numerals and are distinguished from each other by utilizing different ones of the above-mentioned suffixes. Thus, the channel for translating the electrical signal representative of red includes the red-signal amplifier 19R, the signal-combining apparatus 20R, and the power amplifier 21R. A consideration of the units in one of these channels will serve to describe the units in all of the channels.

The amplifier 19R may be a conventional amplifier for translating electrical signals. Such amplifier need not have a translation characteristic linear with signal intensity to any high degree since any usual deviation thereof from linearity will normally have a negligible effect compared to the effect caused by the overlapping color light-transmission characteristics of the dyes employed in the photographic process. However, if a high degree of correction of the effects of such transmission characteristics is desired, it is preferable that the channels through which the electrical signals representing the primary colors are translated have such signal-translating characteristics that any color errors contributed thereby will be a minimum. Additionally the amplifier 19R need not be a wide-band amplifier. A pass band as narrow as 0–1 megacycle may be adequate, the width of such band being related to the scanning speeds and the color acuity of the eye. The signal-combining apparatus 20R, 20G, and 20B will be described more fully hereinafter with reference to the circuit of Fig. 1a. Briefly, the units 20R, 20G, and 20B are cross-coupled to form a matrixing circuit to effect a degree of electrical cross-coupling of the signals translated through the different channels which will compensate for the undesired color-light cross-coupling effects of the dyes in the transparency 15. The power amplifiers 21R, 21G, and 21B may be of a conventional type for developing signals of reasonably high power.

Figure 1A:
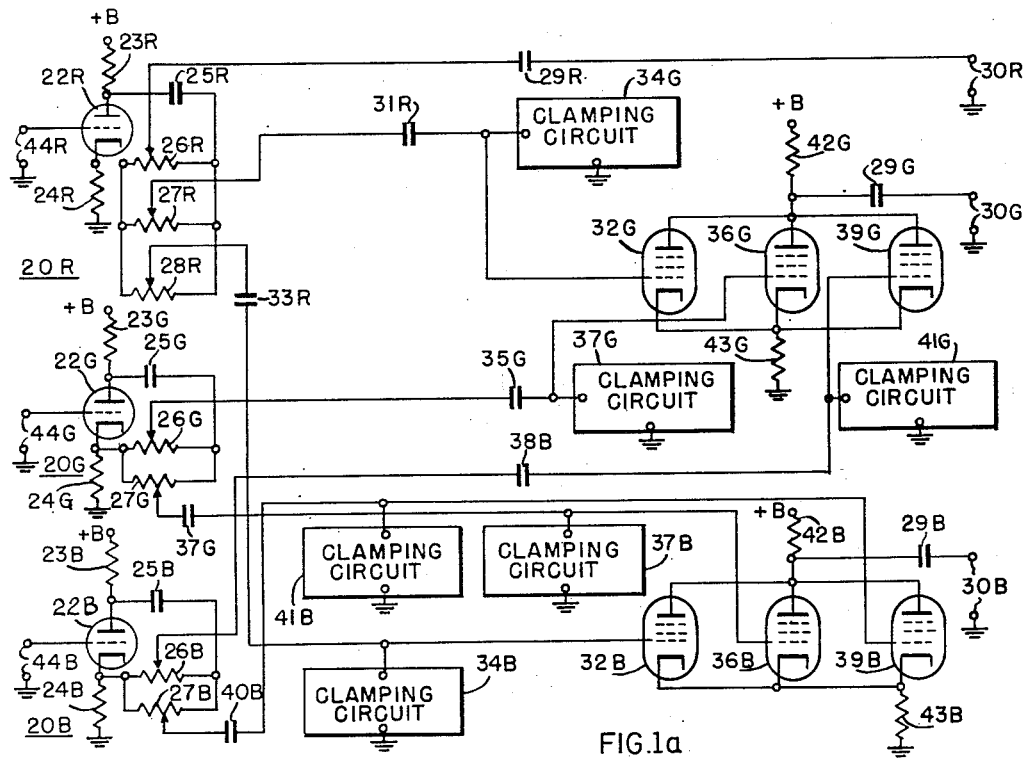
Fig. 1a is a circuit diagram of some of the components of the printer of Fig. 1.

Referring now to Fig. 1a, the units 20R, 20G, and 20B are represented therein in more detail, such units comprising a plurality of signal-combining amplifiers having the gains thereof with respect to the signals translated therethrough proportioned in accordance with the terms of mathematical equations to be considered hereinafter to effect the desired amount of electrical cross-coupling of the signals. As has been done previously herein, corresponding circuit units or elements in each of the apparatus 20R, 20G, and 20B are designated by the same reference numerals but have different letter suffixes. Each of the units 20R, 20G, and 20B comprises a cathode-follower amplifier including a triode, for example, the triode 22R having an anode load resistor 23R and a cathode load resistor 24R individually coupled to different terminals of an operating potential source +B. The anode of each triode is coupled to the cathode of the triode through a condenser, such as the element 25R, in series with a plurality of parallel-connected voltage dividers. The amplifier in the unit 20R includes three such voltage dividers 26R, 27R, and 28R while the triodes in the units 20G and 20B include only two such voltage dividers 26G, 27G and 26B, 27B, respectively. In apparatus designed for use with different sets of primaries, the units 20R, 20G, and 20B would be identical except for the adjustment of the adjustable controls therein. As represented by Fig. 1a, they differ; specifically, the unit 20R is different from the units 20G and 20B due to the fact, as will be discussed more fully hereinafter, that with the set of primary colors considered herein, less correction is needed for red than for green and blue. The adjustable tap on the voltage divider 26R is coupled through a condenser 29R to a pair of output terminals 30R, 30R, while that of the voltage divider 27R is coupled through a condenser 31R to a control electrode of a pentode 32G and that of the voltage divider 28R is coupled through a condenser 33R to a similar control electrode of a corresponding tube 32B in the unit 20B. The adjustable tap on the voltage divider 26G is coupled through a condenser 35G to a control electrode of a pentode 36G while the similar tap on the voltage divider 27G is connected through a condenser 37G to the control electrode of a corresponding tube 36B in the unit 20B. Similarly, the adjustable tap on the voltage divider 26B is coupled through a condenser 38B to the control electrode of a pentode 39G while the corresponding tap on the voltage divider 27B is connected through a condenser 40B to the control electrode of the corresponding pentode 39B. The control-electrode circuits of the tubes 32G, 36G, 39G, 32B, 36B, and 39B include clamping circuits 34G, 37G, 41G, 34B, 37B, and 41B, respectively, to prevent undesired potentials from being developed on such electrodes by the signals applied thereto. The anodes of the tubes 32G, 36G, and 39G are coupled together and are connected through an anode load resistor 42G to the positive terminal of a B potential source while the cathodes of these tubes are also connected together and connected through a resistor 43G to the negative terminal of such source. The anodes and cathodes of the tubes 32B, 36B, and 39B are similarly connected. The anode load resistors 42G and 42B are coupled, respectively, through coupling condensers 29G and 29B to pairs of output terminals 30G, 30G and 30B, 30B, respectively. The circuits including the tubes 32G, 36G, and 39G comprise one signal-combining system and the circuits including the tubes 32B, 36B, and 39B comprise another for combining into composite signals in the composite anode circuit of each combining system the signals applied to the control electrodes of each one of the tubes in each combining system.

Referring again to Fig. 1, the printer also comprises utilization apparatus coupled to the computer for employing the correction signals representative of corrected light flux to effect such illumination of the light-sensitive material that color reproductions developed from such material desirably represent the original scene. More specifically, the utilization appartus comprises a tricolor cathode-ray tube system including a tube 46 preferably including three cathodes individually coupled to different ones of the output circuits of the amplifiers 21R, 21G, and 21B. The cathode-ray tube system also includes deflection windings 47 coupled to the deflection apparatus 12. The tube 46 may be one such as is more fully described in an article entitled "General description of receivers for the dot-sequential color television system which employ direct-view tri-color kinescopes" in the RCA Review for June 1950 at pages 228–232, inclusive. Such a tube includes such a physical alinement of the beam axes of the different cathodes and apertures in an apertured mask 49 with different ones of dots in triangular groups of phosphors on an image screen 50 for emitting different colors that the beams emitted from the different cathodes are directed individually onto different ones of the color phosphors for developing different primary colors. Essentially such tube is a source of a moving spot of light for scanning a transparency 52 in which the intensity and color of the spot of light is controllable in terms of the intensities of three primary colors. The utilization apparatus also includes a focusing lens 51 for optically focusing the beam of light scanning a raster on the image screen 50 onto a color transparency 52, which is supported by members 52a, 52a and which is a duplicate of the transparency 15, and a further focusing lens 53 for optically focusing the light translated through the transparency 52 onto light-sensitive material 54. The material 54 is supported by members 54a, 54a.

It should be understood that different types of utilization apparatus in accordance with the present invention may be employed. In place of the tube 46 and the elements 47 and 12, for example, if low scanning speeds are acceptable in the color printing process being employed, conventional arc lamps with a Nipkow disc and a suitable arrangement of half silvered or dichroic mirrors may be employed. If such are utilized, instead of controlling the light intensity by intensity modulation of the signals applied to the cathodes of a tube, such as the tube 46, the light intensity may be directly modulated by electromechanical shutters or by a device such as a Kerr cell. Additionally, if low scanning speeds are acceptable, a suitable white light source may be employed with moving color filters which are mechanically interposed in the light path between the source and the sensitive material. Each of these filters may include tapered density wedges.

EXPLANATION OF OPERATION OF PRINTER OF FIG. 1

Prior to considering the details of operation of the printer of Fig. 1, it will be helpful more fully to consider the color printing problem previously briefly discussed herein. As previously mentioned, the light passing through a color transparency and emerging from each elemental area thereof varies in a manner wholly determined by the color absorption characteristic and the transparency density or degree of opaqueness of the dyes in each elemental area. Such density is determined by the quantities of the color dyes deposited in such elemental areas in the original photographic development process for developing the color transparency. Theoretically in a trichromatic color process, the three dyes in the transparency for causing optical sensations in terms of the three primary colors, for example, in terms of the primary colors green, red, and blue considered with reference to Fig. 1, should have different nonoverlapping optical response characteristics such as represented by the broken-line curves of Figs. 2a, 2b, and 2c. These figures represent the densities of the dye deposits for the different dyes, for example, yellow, magenta, and cyan for the different wave lengths of light corresponding to blue, green, and red when a light of uniform energy over the band 400–700 millimicrons is applied to such dyes. As exemplified by the broken-line curves of Figs. 2a–2c, inclusive, the dye for controlling the sensation of blue, in other words, the yellow dye, should cause such sensation without disturbing the sensations of red and green individually caused by the cyan and magenta dyes. That is, each of the dyes should have narrow light absorption bands, such as represented by the bands 400–500, 500–600, and 600–700, corresponding to the primary color each is intended to control. No two of such absorption bands should overlap and there should be no gaps between such bands. However, in present printing processes the dyes do have spectral bands which overlap causing the dye for any one primary color also to affect by color contamination at least one other primary color. The spectral responses of one group of dyes now employed in photographic color reproduction are represented by the solid-line curves of Figs. 2a, 2b, and 2c. This overlapping causes color errors evidenced by color contamination to appear in the resultant light emerging from the transparency and such errors appear in any print or other transparency reproduced by means of such emerging light. The nature of such errors may be better understood by considering the effect of one of such dyes on the light which it is intended to absorb as well as on the color lights it is not intended to absorb but to transmit or translate.

Referring to Fig. 2b, it is well understood in photography that the magenta color image or the magenta dye density should be formed by the imposition of green light upon the light-sensitive emulsion of the film. This magenta image in the transparency should completely transmit the blue and red components of a white light while absorbing the green component thereof. However, as is apparent from the response of the magenta dye, as represented by the solid-line curve of Fig. 2b, such dye has a much wider absorption band than the desired narrow band between 500 and 600 millimicrons. It is apparent that a relatively large amount of the blue component of the white light and in the band 400–500 millimicrons is absorbed by the magenta image and not transmitted therethrough and, similarly, a small amount of the red component of the white light in the range of 600–700 millimicrons is absorbed. In a similar manner, referring to Fig. 2a, the yellow dye absorbs at least a small amount of the green component of the white light and, referring to Fig. 2c, the cyan dye absorbs at least small amounts of the blue and green components of the white light. Absorption of such color components causes the color components which are transmitted through the transparency to be modified from what they should be by the amount of improper absorption by the color dyes. For example, if a blue light of a predetermined magnitude should be translated through an elemental area of the transparency, which area includes cyan and magenta dyes, the magnitude of the blue light translated through the transparency is decreased by the absorptions of the magenta and cyan dyes and, therefore, the emerging light does not faithfully represent the magnitude of the blue light in the original scene. Unless correction is made for such improper absorption, the magnitudes of the color lights combining to reproduce the color of an elemental area in the original scene will not be in proper proportions to reproduce such color. As a result, color distortion occurs.

As previously mentioned herein, knowing the deficiencies of the dyes, in other words, knowing the degrees to which they absorb portions of color light they should translate, it is possible to compensate for such improper absorptions by a technique known as masking which has previously been described herein. Briefly, this technique consists in modifying the characteristics of the original transparency in both brightness and color by means of transparent overlays for the conventional color-separation negatives, that is, these overlays are masks so that such light emerges from the original transparency and falls on the sensitized material as to permit another transparency or a color print which faithfully represents the original scene to be developed from such sensitized material. For example, it is possible to develop a mask representing the pattern of the magenta dye in the transparency image equal in intensity to the degree to which the magenta dye absorbs blue light but opposite in character or, in other words, a negative thereof. Such a masking negative would then be employed in register with the color-separation negative for the yellow dye image to compensate for the blue light absorbed by the magenta image. Similarly, other masking negatives can be made to correct for the improper light absorptions of the yellow and cyan dyes. The printer of Fig. 1 electrically causes such masks to be developed on the image screen 50 of the tube 46. More specifically, there is developed on such image screen a color image which to any desired degree of perfection is the inverse of the color error content of the resultant light translated through the transparency 15. Being the inverse of such error content, it effectively cancels the errors so that the light emerging from the screen 50 and translated through the transparency 52 is modified as if a set of color-correcting masks had been utilized. The manner in which such correction is made will now be considered in more detail.

It is known that selected amounts of primary color lights transmitted through a medium having a pass band which is uniform over the spectral range of such primary colors combine to develop a white light. Therefore, if the densities of the magenta, cyan, and yellow dyes in a transparency are such as to cause equal quantities of red, green, and blue light to be translated therethrough, such densities of the dyes define the required densities for a gray or neutral light. Figs. 3a, 3b, and 3c are graphs of the composite dye densities which will combine over the visible spectrum to develop a gray light. Fig. 3a represents the ideal concentrations of the dye densities in which equal amounts of the three dyes combine to develop the neutral light. The actual proportions of the dye densities are as represented by Fig. 3b where the areas under the curves Y, M, and C represent the relative amounts of the dye densities of the yellow, magenta, and cyan dyes which combine to develop an essentially neutral light as represented by the area under the curve N. The relative contributions throughout the visible spectrum of the yellow, magenta, and cyan dyes as actually represented by the curves of Fig. 3b are approximately represented in generalized form by the corresponding curves of Fig. 3c. The relative transmissions of the different dyes for the different color lights to cause a white light to emerge from an area including dyes in the proportions represented by Fig. 3c may be tabulated as follows:

Table I

| Dye | Density (Degree of Opaqueness) of Dye to— | | |
| --- | --- | --- | --- |
| | Red Light | Green Light | Blue Light |
| Cyan | 1.5 | .45 | .45 |
| Magenta | 0 | .90 | .45 |
| Yellow | 0 | .15 | .60 |
| Total Dye Densities | 1.5 | 1.5 | 1.5 |

From Table I it is apparent that equal amounts of red, green, and blue lights emerge from an area having dye densities set forth in the table. Since equal amounts of the red, green, and blue lights do emerge, a neutral or white light is developed by such combination of dye densities. However, it should be noted that the concentrations of the dye densities are such that the cyan dye is the only dye absorbing red light having a contrast of 1.5 for the red light, magenta is not the only dye absorbing green light and thus has a contrast of only 0.9 for green, and yellow is not the only dye absorbing blue light and thus has a contrast of only 0.6 for blue. These differences represent the unbalance of the dyes in absorbing different color lights to produce the neutral light, such unbalance resulting from undesired light absorptions of the different dyes.

If it is assumed that the dye distributions represented by Figs. 3b and 3c are the densities of the cyan, magenta, and yellow dye layers in an area of a color transparency, that these densities arise from exposure of the original film to a scene having a reflection density of 1.0 in red, green, and blue for the area represented in the transparency, and it is also assumed that the reflection density of 0 is recorded in the transparency as clear or completely transparent film, the gray scale gamma in the processing of the film will be 1.5, as evidenced by Table I above. If the color transparency which represents the scene is to be duplicated exactly, then, provided the same photographic material is used, it is axiomatic that the duplicate will have an identical set of dye distributions for the corresponding area. However, as indicated by Table I above and the curves of Figs. 3b and 3c, the original scene as represented by such duplicate transparency would be considerably distorted in both luminance and chromaticity by the photographic process. In other words, an exact duplicate of the original transparency cannot be made by simply photographing the original transparency since in such a process the gray scale gamma would be raised by the second power of 1.5 or to a gamma of 2.25. In addition, the colors in the duplicate transparency would be distorted, the magenta dye layer in such transparency including an appreciable and undesired amount of the cyan and yellow dye densities of the original transparency since green light would be absorbed by both of these dyes in the original transparency. Similar effects would result with respect to the yellow dye and to a lesser degree with respect to the cyan dye in the duplicate transparency. To offset these luminance and chromaticity errors, masking is required.

The characteristics of the required masks in order to compensate for the undesired color effects may be determined by a mathematical analysis of the transmission characteristics of the different dyes for the different primary color lights. By utilizing the information developed in the previous considerations of the dye densities and, specifically, with respect to the curves of Figs. 3$b$ and 3$c$, a series of equations defining total densities may be developed. Examining Fig. 3$c$, it is noted that the densities of the transparency to the color lights red, green, and blue, hereinafter represented respectively by the symbols $D_{OR}$, $D_{OG}$, and $D_{OB}$, are individually definable in terms of the sums of the individual densities of the dyes for the different colors. This may be stated mathematically as follows:

$$D_{OR} = D_{CR} + D_{MR} + D_{YR} \quad (1)$$

$$D_{OG} = D_{CG} + D_{MG} + D_{YG} \quad (2)$$

$$D_{OB} = D_{CB} + D_{MB} + D_{YB} \quad (3)$$

where the symbol D represents density, the subscripts C, M, and Y refer, respectively, to cyan magenta, and yellow dyes, and the subscripts R, G, and B refer, respectively, to the color lights red, green, and blue.

It is well known in the photographic art that the densities of a dye for the different color lights have definite fixed relationships and thus the density of a dye for any color may be defined in terms of a constant multiplier for the density of the dye for one selected color. Using such relationship, the Equations 1–3, inclusive, may be rewritten, respectively, as Equations 4–6, inclusive, as follows:

$$D_{OR} = A_{11}D_{CR} + A_{12}D_{MG} + A_{13}D_{YB} \quad (4)$$

$$D_{OG} = A_{21}D_{CR} + A_{22}D_{MG} + A_{23}D_{YB} \quad (5)$$

$$D_{OB} = A_{31}D_{CR} + A_{32}D_{MG} + A_{33}D_{YB} \quad (6)$$

where the A's are different constant multipliers.

Using the numerical relationships tabulated in Table I to provide the values for the different multipliers, the relationships of Equations 4–6, inclusive, when solved for $D_{CR}$, $D_{MG}$, and $D_{YB}$ reduce to:

$$D_{CR} = D_{OR} \quad (7)$$

$$D_{MG} = -.334D_{OR} + 1.14D_{OG} - .286D_{OB} \quad (8)$$

$$D_{YB} = -.171D_{OR} - .57D_{OG} + 1.14D_{OB} \quad (9)$$

It should be noted that Equations 7–9, inclusive, define the dye distributions in an area in terms of three factors relating to the total color density of the light on that area.

It has previously been mentioned herein that the reflectance values of the original scene, in other words, the intensities of the lights reflected from the original scene, are recorded by the dye layers at three different values of contrast or three different gammas. In order completely to define the corrections to be made to the color lights emerging from a color transparency or reflected from a color print, the three densities should be restated so as to have unit contrast. In other words, the masked or corrected transparency should present lights of the following densities to the eyes of an observer and particularly to the surface of the sensitized duplicating material if the scene to be duplicated is to be faithfully reproduced. These densities are definable as follows:

$$D_{C}' = \frac{D_{CR}}{\gamma_{CR}} \quad (10)$$

$$D_{M}' = \frac{D_{MG}}{\gamma_{MG}} \quad (11)$$

$$D_{Y}' = \frac{D_{YB}}{\gamma_{YB}} \quad (12)$$

In practice, these densities will comprise the density of the masks employed plus the density of the transparency. That is:

$$D_{C}' = D_{OR} + M_R \quad (13)$$

$$D_{M}' = D_{OG} + M_G \quad (14)$$

$$D_{Y}' = D_{OB} + M_B \quad (15)$$

Rearranging Equations 13–15, inclusive, to solve for the densities of the masks $M_R$, $M_G$, and $M_B$ in terms of the densities of the red, green, and blue lights from the original scene and utilizing the relationships expressed in Equations 10–12, inclusive, and 7–9, inclusive, in that order to provide $D_C'$, $D_M'$, and $D_Y'$ in terms of $D_{OR}$, $D_{OG}$, and $D_{OB}$, such masks may be defined as follows:

$$M_R = -.333D_{OR} \quad (16)$$

$$M_G = -.372D_{OR} + .269D_{OG} - .318D_{OB} \quad (17)$$

$$M_B = -.285D_{OR} - .95D_{OG} + .90D_{OB} \quad (18)$$

Equations 16–18, inclusive, define the characteristics of the masks needed to obtain exact duplication of the original transparency when the dye absorptions are such as represented by Fig. 3$c$. The mathematical solution for actual absorptions such as represented by Fig. 3$b$ is more involved and may not be necessary since the corrections made based on absorptions such as represented by Fig. 3$c$ will probably be all that are desired.

Referring to Fig. 1$a$, the signals developed in the voltage dividers in the output circuits of the tubes 22R, 22G, and 22B of the signal-combining apparatus 20R, 20G, and 20B represents, respectively, the densities of the red, green, and blue lights or, in other words, the terms $D_{OR}$, $D_{OG}$, $D_{OB}$ in the Equations 16–18, inclusive. It should be mentioned at this point that such representation is only accurate for small ranges of variation of such signals in view of the fact that dye density is logarithmically related to light transmission and that the printer of Fig. 1 does not include apparatus for logarithmic translation of the light-transmission signals developed by the photocells. However, the errors introduced by the lack of such logarithmic conversion may, for some purposes, be much less than the photographic processing errors just discussed. Consequently, though the printer of Fig. 1 does not include all of the apparatus for effecting highly accurate color correction, it is simple and inexpensive and will provide the benefits of the invention to a large degree. Hereinafter, for purposes of simplicity in presentation, the signals utilized in the computer of the printer of Fig. 1 will be considered to be density signals rather than light-transmission signals.

To develop the mask $M_R$ as defined by Equation 16, the voltage divider 26R is adjusted to provide the magnitude of $D_{OR}$ as defined by Equation 16, in other words, at one-third the total $D_{OR}$. This signal is then applied through the condenser 29R and the terminals 30R, 30R to the power amplifier 21R. The mask $M_G$ as defined by Equation 17 is developed by the addition of the proper proportions of signals representing $D_{OR}$, $D_{OG}$, and $D_{OB}$ by means of the signal-combining tubes 32G, 36G, and 39G. Thus, from the voltage divider 27R a fraction .372$D_{OR}$ is applied to the control electrode of the tube 32G. A fraction .269$D_{OG}$ is applied from the voltage divider 26G through condenser 35G to the control electrode of the tube 36G. Similarly, a fraction .318$D_{OB}$ is applied from the voltage divider 26B through the condenser 38B to the control electrode of the tube 39G. The signals applied to the tubes 32G, 36G, and 39G combine in the anode circuits of these tubes to develop at the output terminals 30G, 30G a signal representative of the mask $M_G$. In a similar manner signals are combined in the tubes 32B, 36B, and 39B to develop at the output terminals 30B, 30B a signal representative of the mask $M_B$.

Referring to Fig. 1, in the absence of any control signals applied to the cathodes of the tube 46, the latter tube is effective to develop a moving neutral spot of light utilizing properly proportioned amounts of the green, red, and blue lights emitted from the exited phosphors on the screen 50 of such tube. This neutral spot of light is caused to scan the surface of the transparency 52 with a constant intensity so as to cause a resultant light to emerge from the transparency 52 which corresponds to the resultant light which emerges from the transparency 15. As previously explained, such resultant light is distorted in both brightness and chromaticity and, if used directly on the light-sensitive material 54 for the purpose of duplicating the scene on the transparency 52, such duplication would not be exact. However, the signals translated through the amplifiers 21R, 21G, and 21B representing, respectively, the masks $M_R$, $M_G$, and $M_B$ required to correct for the overlapping light-transmission characteristics of the dyes in the transparency 52 modulate the intensities of the beams emitted from the different cathodes in the tube 46 to cause a moving spot of light to be emitted from the screen 50 which deviates in luminance and chrominance from the neutral light emitted without such modulation of the beams. The deviation is such as to develop a virtual correction mask on the image screen of the tube 46. In other words, the spot of light emitted from such screen is precompensated for the light-transmission defects of the transparency 52 so that the light emerging from the transparency 52 effectively duplicates the light reflected from the scene originally photographed or, if desired, represents such light reflected from the original scene improved in color and brightness in any manner desired by the photographer. As a result, the light-sensitive material 54 when photographically processed either accurately duplicates the brightness and color of the original transparency or is an improvement on the brightness and color thereof. It should be noted that by means of the operation just described, the definition of the color print made from the light-sensitive material 54 is not dependent on any spot size of the light emerging from the screen 50 since only low-frequency color correction is employed while the high frequency and high definition are obtained directly without correction.

The above explanation of the adjustment of the voltage dividers in the signal-combining apparatus 20R, 20G, and 20B assumes that the operator has complete knowledge of all of the factors requiring correction. Actually, factors other than the known deficiencies of the dyes may cause a large fraction of the error and therefore require correction. For example, the responses of the photoelectric cells 18B, 18G, and 18R may not be as desired and may introduce brightness and color errors into the printer. Additionally, deviations of the intensity and color content of the scanning beam of light used either at the flying-spot scanner 10 or at the printing light source 46 may affect the fidelity of reproduction. Therefore, in addition to the adjustments previously described herein, additional corrections for the system as a whole may be made by initially utilizing, in place of the transparency 15, a color test chart including a large number of colors, for example, eight colors. A photographic print from such transparency may then be made and the color and brightness of the print compared with the original for each of the colors. Corrections may then be made in the printer to compensate for the differences between the original and the print therefrom.

DESCRIPTION AND EXPLANATION OF OPERATION OF COLOR PRINTER OF FIG. 4

There has been described with reference to Fig. 1 a printer which is of simple construction utilizing a minimum number of units to effect the desired corrections. However, the printer of Fig. 1 does utilize two copies of the same transparency and two light sources to effect such corrections. Additionally, as previously discussed, such printer in omitting some units has a high degree of accuracy only for small ranges of variation of the signals $D_{OR}$, $D_{OG}$, and $D_{OB}$ representative of light density. It may be desirable to improve the accuracy of such printer and to utilize a light source serving the dual purpose of providing light representative of the transparency for developing the signals $D_{OR}$, $D_{OG}$, and $D_{OB}$ and for providing corrected light to energize the light-sensitive material. The printer of Fig. 4 is of such type.

In considering the printer of Fig. 4, since many of the units included therein are the same as units in the printer of Fig. 1, corresponding units are designated by the same reference numerals.

In the printer of Fig. 4, there are two paths for the light emitted from the screen of cathode-ray tube 46, one including the focusing lens 14, the transparency 15, a collecting lens 60, a half-silvered mirror 61, and the photocells 18B, 18G, and 18R. The other path includes the units 14, 15, 60, and 61 as well as the focusing lens 53 and the light-sensitive material 54.

Each of the signal-translating channels in the computer of Fig. 4 includes, in addition to the units of such channels as described with reference to Fig. 1, a logarithmic device and a signal-subtraction circuit coupled in series between the initial signal amplifier and the signal-combining apparatus. Additionally, each channel includes a gamma amplifier and an antilogarithmic device coupled between the output circuit of the signal-combining apparatus and the power amplifier in such channel. For example, the channel for translating the red signal includes a logarithmic device 62R, a signal-subtraction circuit 63R, a gamma amplifier 64R, and an antilogarithmic device 65R. The channels for the green and blue signals include corresponding units designated by the same reference numbers but with suffixes G and B, respectively. Additionally, in the printer of Fig. 4 in each of the signal-translating channels there is a feed-back path coupling the output circuit of the signal-combining apparatus in each channel with an input circuit of the signal-subtraction circuit in each channel. The signal-subtraction circuit may be any of a number of forms, for example, a resistor matrix in which the positive value of one signal and the negative value of another signal are combined to develop a signal which is the difference between such signals, or preferably may have the form of one of the signal-combining circuits described with reference to Fig. 1a. In the latter case, one signal is applied to the control electrode of a multi-electrode tube and another signal is applied to the control electrode of another multi-electrode tube, the anode circuits of these tubes including a common load resistor. By causing one of the applied signals to be positive and the other negative, the signal developed in the common anode circuit represents the difference between the applied signals.

Logarithmic devices for converting a linear signal into a logarithmic signal representative thereof as effected by, for example, the device 62R and antilogarithmic devices for converting a logarithmic signal into a linear signal representative thereof as, for example, the device 65R may have a basic circuit such as represented by Fig. 4a. The device of Fig. 4a will be described as representing the device 62R, it being understood that the devices 62R, 62G, and 62B are identical and similarly the devices 65R, 65G, and 65B. It will be explained more fully hereinafter how the device of Fig. 4a can function either as a logarithmic or antilogarithmic device depending on the type of signal applied thereto. The device of Fig. 4a includes a pair of input terminals 66R, 66R and a pair of output terminals 67R, 67R, an input load resistor 68R being coupled across the terminals 66R, 66R. The device also includes a plurality of diodes 69R–73R, inclusive, the anodes of the diodes 69R–72R, inclusive, being coupled, respectively, through resistors 74R–77R, inclusive, to one terminal of the resistor 68R while the anode of the diode 73R is directly coupled to such terminal. The cathodes of the diodes 69R–73R, inclusive, are individually coupled to different positive-potential taps on a plurality of voltage dividers 78R–82R, inclusive, each of which is coupled across a source of potential +B. The output terminals 67R, 67R are individually coupled to the anode of the diode 73R and to the negative terminal of the source of potential +B.

In general, the printer of Fig. 4 operates in a manner similar to that of the printer of Fig. 1. However, in the printer of Fig. 4 the cathode-ray tube 46 serves the dual purpose of providing light representative of the transparency 15 for utilization by the computer to develop the correction signals $M_R$, $M_G$, and $M_B$ defined by Equations 16–18, inclusive, and of providing light for activating the light-sensitive material 54 to reproduce a desired image of the scene represented by the transparency 15. In this way, a single light source is employed thereby reducing the problems of obtaining preciseness of coordination of scanning of similar transparencies by different light sources. However, the utilization of a single light source does cause the light developed thereby and transmitted through the transparency 15 to have corrected densities such as defined by Equations 13–15, inclusive, and if signals representative of such densities were applied to the signal-combining apparatus 20R, 20G, and 20B, correction signals $M_R$, $M_G$, and $M_B$ as defined by Equations 16–18, inclusive, would not be developed. In order to develop the latter correction signals, the components represented by the terms $M_R$, $M_G$, and $M_B$ in Equations 13–15, inclusive, should first be canceled from the signals developed in the output circuits of the cells 18B, 18G, and 18R so that only the signals represented by the terms $D_{OR}$, $D_{OG}$, and $D_{OB}$ in the latter equations are applied to the units 20R, 20G, and 20B, respectively. This cancellation is effected in the units 63R, 63G, and 63B by applying to these units signals $M_R$, $M_G$, and $M_B$, respectively, developed in the output circuits of the units 20R, 20G, and 20B, respectively. In this manner the signals applied to the input circuits of the units 20R, 20G, and 20B are $D_{OR}$, $D_{OG}$, and $D_{OB}$ as required to perform the operations defined by Equations 16–18, inclusive. In considering the above, as in considering any feed-back system, it should be noted that the $M_R$, $M_G$, and $M_B$ signals which are components of the signals applied to the subtraction circuits 63R, 63G, and 63B, respectively, are correction signals which were developed by the units 20R, 20G, and 20B, respectively, at a prior time whereas the signals fed back from the output circuits of the latter units to effect cancellation of such correction signals are developed at a more recent time. As a result, preferably, the feed-back path should include delay circuits to equalize the time of travel of the components $M_R$, $M_G$, and $M_B$ through the path including the cathode-ray tube 46 with the time of travel of such components through the feed-back path. Otherwise, such cancellation might tend to introduce undesired errors especially if the correction signals were high-frequency signals. On the other hand, if low-frequency correction signals are employed, the time difference between the two sets of correction signals in the units 63R, 63G, and 63B becomes unimportant since such time difference will be much less than the period of a cycle of the low-frequency correction signals.

The logarithmic devices 62R, 62G, and 62B are utilized to cause the signals $D_{OR}$, $D_{OG}$, and $D_{OB}$ more accurately to represent the different light densities. The conversion from light transmitted through a transparency or reflected from a color print to a potential representative of the photographic densities of the different dyes in such transparency or print is not a linear one and if linear conversion is utilized as in the printer of Fig. 1, the signal developed only accurately represents such densities over a small range of signal variations. By definition the light transmittance of a developed photographic deposit is the ratio of the light that it transmits to the light that is incident thereon and is logarithmically related to the optical density. In other words, the optical density is equal to the logarithm of the transmittance. Therefore, in order to develop electrical signals $D_{OR}$, $D_{OG}$, and $D_{OB}$ which more accurately represent the photographic densities for red, green, and blue lights, respectively, it is preferable to utilize a logarithmic device to convert the signals developed in the output circuits of the photocells 18B, 18G, and 18R and representative of the light transmittance of the dyes in the transparency 15 into signals logarithmically related thereto and thus representative of the densities of such dyes.

Logarithmic devices though available and known in the art are usually somewhat complex especially when logarithmic relationships are to be accurately obtained over a wide frequency range. The logarithmic device represented by Fig. 4a provides a means of approximating the logarithmic relationship to any desired degree of accuracy.

Essentially, the unit of Fig. 4a is an impedance device in which the impedance varies logarithmically in steps with equal increments in the applied current. The step-by-step logarithmic variation is effected by sequentially causing the diodes 69R–73R, inclusive, individually to start to conduct at different levels of the voltage developed across the resistor 68R by the applied current. As each diode conducts, the load impedance initially represented solely by the resistor 68R includes the conducting diode or diodes and is changed logarithmically with respect to the linear change in the applied current. This results in an output voltage logarithmically related to the input current. This relationship is generally defined as $$e = \log i$$

The impedances of the conducting diodes and of the resistor 68R are in parallel and the levels at which the diodes conduct are controlled by the bias voltages applied to the cathodes thereof. The signals developed in the photocells 18B, 18G, 18R and representative of the transmittance of the dyes in the transparency 15 are amplified in the units 19R, 19G, and 19B and applied to the units 62R, 62G, and 62B, respectively. The signals developed in the output circuits of the latter units are those defined by Equations 13–15, inclusive, above and are utilized in the units 20R, 20G, and 20B in the manner previously described.

The antilogarithmic units 65R, 65G, and 65B perform operations complementary to the units 62R, 62G, and 62B, respectively, and are similar in design to the latter units differing therefrom solely by including in the output circuits thereof a common resistor of low magnitude between the low-potential terminals of the voltage dividers 78R–82R, inclusive, of Fig. 4a and the negative terminal of the B-potential source, in other words, chassis ground. In such a unit if a voltage is applied to the input terminals thereof, the current flowing through such resistor will vary as the antilogarithm of such applied voltage and thus such unit may be utilized to convert the applied voltage into an output voltage which is antilogarithmically related thereto. The reason why such antilogarithmic relation is developed may be more fully understood by recalling that, as previously explained herein, the operation of the unit of Fig. 4a may be defined as $e = \log i$ where $e$ is the voltage developed across the output terminals 67R, 67R and $i$ is the current applied to the input terminals 66R, 66R. That is, where the applied current is controlled, as for example by a constant-current source, to have a definite relationship then the voltage developed in the output circuit of the unit of Fig. 4a is logarithmically related to such applied current. If now, a controlled voltage $e$ is applied to the input terminals 66R, 66R, since the manner of operation of the unit of Fig. 4a does not change, the relationship of such applied voltage to the output current developed across a low-value resistor must be defined as $i = \log^{-1} e$. In other words, such current is antilogarithmically related to the applied voltage.

The gamma amplifiers 64R, 64G, and 64B are provided to compensate for any gamma of the cathode-ray tube 46.

DESCRIPTION AND EXPLANATION OF OPERATION OF PORTION OF PRINTER OF FIG. 5

When employing a conventional cathode-ray tube as the light source and as described with reference to Figs. 1 and 4, it may be difficult to obtain a spot of emitted light which is sufficiently bright for photographic exposure purposes especially if high scanning rates are utilized and if such scanning rates are constant. At times it may be desirable to obtain a spot of exceedingly high brightness and at other times only a low-brightness spot may be required. To effect this result, a cathode-ray tube may be utilized in a more efficient manner by including control circuits for such tube so that the scanning rate of the spot of light is slowed and thus the intensity of the light emitted from the tube is increased for photographic purposes for areas in the scene requiring such light intensity while the scanning rate is increased resulting in lower intensity light for areas in such scene requiring relatively little light. The portion of the printer represented by Fig. 5 effects such results. Since such portion is intended to replace the corresponding portion of the printer of Fig. 4, units in Fig. 5 which are the same as units in Fig. 4 are identified by the same reference numerals. For simplicity of representation and explanation the optical apparatus and photocells of Fig. 4 have been omitted in Fig. 5.

In general, the portion of the printer of Fig. 5 differs from the corresponding portion of the printer of Fig. 4 in that it includes circuits to effect the desired modulation of the scanning velocities of the beams in the cathode-ray tube 46 whereas the printer of Fig. 4 does not. In order to permit such velocity modulation of the beams, additional circuits are included in the portion of the computer represented by Fig. 5 to compensate for the effects of such velocity modulation on the light emitted from the cathode-ray tube screen as viewed by photocells such as the units 18B, 18G, and 18R represented in Fig. 4. More specifically, the portion of the computer represented by Fig. 5 includes in each of the channels for individually translating different ones of the signals representative of the densities of the primary colors an additional signal-subtraction circuit 91 coupled between the signal-combining apparatus 20 and the gamma amplifier 64. In the different channels such signal-subtraction circuits are identified as units 91R, 91G, and 91B. In addition, a plurality of diodes 87R, 87G, and 87B have anodes individually coupled, respectively, to the output circuits of the units 20R, 20G, and 20B and cathodes connected together and coupled to input circuits in each of the units 91R, 91G, and 91B. An antilogarithmic device 88 of a tape previously described, a deflection control circuit 89, and an auxiliary deflection winding 90 are coupled in cascade, in the order named, with the cathodes of the tubes 87R, 87G, and 87B. The deflection control circuit 89 and auxiliary deflection winding 90 may be of a conventional type such as has been described, for example, in United States Patent No. 2,182,326 to Urtel for effecting control of the scanning rate of a cathode-ray beam. More specifically, the unit 89 in response to the changes from one brightness level to another, as represented by the signals applied thereto, increases or decreases the scanning velocity of the beam in proportion to the change in level. The unit 89 differs from the circuits described in the patent to Urtel insofar as it energizes a deflection winding 90 rather than a pair of deflection electrodes as in Urtel. Therefore, a sawtooth signal is developed in the auxiliary winding rather than the pulse-type signal on the auxiliary deflection electrodes in the aforesaid patent. The subtraction circuits 91R, 91G, and 91B are similar to the previously described circuits 63R, 63G, and 63B.

As previously mentioned, it is the function of the portion of the printer represented by Fig. 5 to obtain, for photographic purposes, highly efficient utilization of the light emitted from the cathode-ray tube 46 for illuminating a transparency or a color print in order that other color prints or transparencies may be developed therefrom in the manner previously described herein. By employing velocity modulation of the scanning beams, the average time required for exposure of a print or transparency may be substantially reduced. For example, assume that the maximum light energy for exposure of an elemental area of a sensitized material in a given period as obtained from the cathode-ray tube when employing constant velocity scanning has an arbitrary magnitude of 1. Then, assuming a linear relationship between such light energy emitted from the cathode-ray tube and the velocity of the scanning beams therein, such light energy can be increased by a factor of 10 by reducing the scanning velocity by a factor of 10. In this manner, increased amounts of such light energy are obtainable in those areas of the transparency where such is required while the time required for exposure of an average print or transparency may be substantially reduced.

One factor determining the above-mentioned light energy required in an elemental area is the magnitude of the maximum one of the correction signals or masking densities for the primary colors in such area. Such magnitude is represented by the maximum one of the density signals $D_R$, $D_G$, and $D_B$ in the output circuits of the units 20R, 20G, and 20B, respectively. Therefore, in the portion of the printer of Fig. 5 such signals are individually applied to different ones of the anodes of the diodes 87R, 87G, and 87B to develop in the common cathode circuit thereof, since only that diode having the maximum signal thereacross will conduct, a signal $D_S$ which is representative at any instant of the maximum one of the signals $D_R$, $D_G$, and $D_B$. The signal $D_S$ is utilized to control the velocity of the scanning beams in the tube 46 in proportion to its magnitude by being converted to the antilogarithm thereof in the unit 88 so as to represent light transmission instead of density and the converted signal is applied to the unit 89 to control the instantaneous slope of the trace portion of the saw-tooth signal developed at line frequency by the unit 89 across the winding 90. The instantaneous slope of the trace portion of the latter sawtooth signal controls the speed with which the beams in the tube 46 trace a raster on the image screen thereof. The forces developed by the winding 90 are such as to slow down or arrest the scan when more than normal amounts of exposure or light energy are required for any one of the primary colors as determined by the magnitudes of the signals $D_R$, $D_G$, and $D_B$. For normal amounts of light exposure, the units 89 and 90 exercise no control over the scanning velocity of the electron beams, such being solely controlled by the conventional unit 12 and windings 47.

The control of the scanning velocity as just explained affects not only the light energy emitted by the cathode-ray tube for the primary color light for which the light exposure is to be increased but also would increase the light exposures of the other primary colors emitted from the tube if compensation for such latter increase is not provided. Such compensation is, however, provided by the units 91R, 91G, and 91B. These units control the intensities of the cathode-ray beams to degrees determined by the individual differences in magnitudes of the signals $D_R$, $D_G$, and $D_B$ with respect to the magnitude of the signal $D_S$. For example, if it is assumed that the signal $D_R$ has the greatest magnitude, then the signal $D_S$ is inherently equal to $D_R$ because of the nature of the operation of the diodes 87R, 87G, and 87B and, as previously explained, such signal $D_S$ controls the scanning velocity of the beams in the tube 46 to develop the proper light exposure for a signal having the magnitude $D_R$. However, in developing such light for the signal $D_R$, similar increases in the light exposures for the signals $D_G$ and $D_B$ would occur unless the intensities of the beams corresponding to the latter signals are decreased in proportion to the degree to which their light outputs tend to increase with the change in the velocity of the scanning beams caused by the signal $D_S$. The intensities of the three electron beams are individually controlled by different ones of the units 91R, 91G, and 91B. Since the signals $D_R$ and $D_S$ are of the same magnitude, the intensity of the beam emitted from the cathode coupled to the unit 91R is unaffected while the intensities of the beams emitted from the cathodes coupled to the units 91G and 91B are decreased by amounts which are individually proportional to the differences between the signal $D_S$ and the signals $D_G$ and $D_B$, respectively. In this manner the intensities of such beams are decreased by amounts proportional to the increased light output that would be developed by such beams as a result of the slowing down of the scanning velocity of such beams by the signal $D_S$. By means of such operation, the desired increased light exposure is obtained for the signal $D_R$ while the light exposures for the signals $D_G$ and $D_B$ remain in the ratio of the magnitudes of the signals $D_R$, $D_G$, and $D_B$. Therefore, by utilizing velocity modulation of the scanning rate of the electron beams in the tube 46, the range of light exposures obtainable from such tube is substantially increased thereby permitting decreased exposure time. Such increased efficiency in the utilization of the light emitted from the tube 46 is obtained without changing the ratio of the light outputs for the signals $D_R$, $D_G$, and $D_B$.

There has been described herein a color printer which substantially instantaneously minimizes the effects of undesired photographic cross coupling in the photographic process by utilizing electronic cross coupling of signals which is complementary to the photographic cross coupling. In effect, the printer described herein develops a virtual color mask on the image screen of the light source employed which is inherently in perfect register with the transparency and which has color and density variations complementary to the undesired color and density variations caused by the dyes in the transparency. When employing the printer described herein, all of the high frequency or fine detail information is optically translated from the print or transparency to be reproduced to the sensitized material. In other words, the correction of the deficiencies in the transparency is effected by means of only relatively low frequency-control signals for developing a virtual mask having coarse detail. The improved color printer described above effects all of these desired results without delay in the photographic process, the correction being made simultaneously with the exposing of the light-sensitive material to the light emerging from the transparency to be reproduced. The improved color printer does not require the storage of correction signals as previously practiced. Additionally, by utilizing velocity modulation of the scanning beam of light, a greatly increased contrast range is obtained.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A photographic color printer useful in a photographic process having color light-transmission characteristics substantially definable by a plurality of mathematical functions for reproducing on light-sensitive material from one color reproduction of a scene other color reproductions thereof comprising: a source of light of composite color for illuminating the one reproduction to develop therefrom a resultant light of composite color which represents the scene but tends to deviate from a desired representation thereof by a degree determinable by means of the mathematical functions; a computer including electro-optical transducer apparatus responsive to said resultant light for substantially simultaneously developing therefrom a plurality of electrical signals individually representative of different component colors thereof and including a plurality of signal-translating channels individually having signal transfer characteristics determined by individual ones of said mathematical functions for substantially simultaneously translating in individual ones of said channels different ones of said electrical signals and deriving therefrom electrical correction signals representative of the light correction needed in the photographic process to develop the other color reproductions so that they desirably represent the scene; and utilization apparatus coupled to said computer for employing said correction signals to effect such illumination of the light-sensitive material that the other reproductions developed therefrom desirably represent said scene.

2. A photographic color printer useful in a photographic process having color light-transmission characteristics substantially definable by a plurality of mathematical functions and for reproducing on light-sensitive material from one color reproduction of a scene other color reproductions thereof comprising: a source of light of composite color including at least two primary colors of said photographic process for illuminating the one reproduction to develop therefrom a resultant light of composite color simultaneously including at least two primary colors of said photographic process which represents the scene but tends to deviate from a desired representation thereof by a degree determinable by means of the mathematical functions; a computer including electro-optical transducer apparatus responsive to said resultant light for substantially simultaneously developing therefrom a plurality of electrical signals individually representative of different component colors thereof and including a plurality of signal-translating channels individually having signal transfer characteristics determined by individual ones of said mathematical functions for substantially simultaneously translating in individual ones of said channels different ones of said electrical signals and deriving therefrom electrical correction signals representative of the light correction needed in the photographic process to develop the other color reproductions so that they desirably represent the scene; and utilization apparatus coupled to said computer for employing said correction signals to effect such illumination of the light-sensitive material that the other reproductions developed therefrom desirably represent said scene.

3. A photographic color printer useful in a photographic process having color light-transmission characteristics substantially definable by a plurality of mathematical functions for reproducing on light-sensitive material from one color reproduction of a scene other color reproductions thereof comprising: a cathode-ray tube for developing a moving beam of white light for illuminating the one reproduction to develop therefrom a moving beam of resultant color light simultaneously including at least two primary colors of said photographic process which represents the scene but tends to deviate from a desired representation thereof by a degree determinable by means of the mathematical functions; a computer including electro-optical transducer apparatus responsive to said resultant light for substantially simultaneously developing therefrom a plurality of electrical signals individually representative of different component colors thereof and including a plurality of signal-translating channels individually having signal transfer characteristics determined by individual ones of said mathematical functions for substantially simultaneously translating in individual ones of said channels different ones of said electrical signals and deriving therefrom electrical correction signals representative of the light correction needed in the photographic process to develop the other color reproductions so that they desirably represent the scene; and utilization apparatus coupled to said computer for employing said correction signals to effect such illumination of the light-sensitive material that the other reproductions developed therefrom desirably represent said scene.

4. A photographic color printer useful in a photographic process having color light-transmission characteristics substantially definable by a plurality of mathematical functions for reproducing on light-sensitive material from one color reproduction of a scene other color reproductions thereof comprising: a cathode-ray tube for developing a moving beam of white light for illuminating the one reproduction to develop therefrom a resultant color light simultaneously including at least two primary colors of said photographic process which represents the scene but tends to deviate from a desired representation thereof by a degree determinable by means of the mathematical functions, said tube including a control circuit for controlling the intensity of said beam of light; a computer including electro-optical transducer apparatus responsive to said resultant light for substantially simultaneously developing therefrom a plurality of electrical signals individually representative of different component colors thereof and including a plurality of signal-translating channels individually having signal transfer characteristics determined by individual ones of said mathematical functions for substantially simultaneously translating in individual ones of said channels different ones of said electrical signals and deriving therefrom electrical correction signals representative of the light correction needed in the photographic process to develop the other color reproductions so that they desirably represent the scene; means for supporting light-sensitive material; means for directing said beam of light onto said material; and means for applying said correction signals to said control circuit for controlling the intensity of said beam to effect such illumination of said light-sensitive material thereby that the other reproductions develop therefrom desirably represent said scene.

5. A photographic color printer useful in a photographic process having color light-transmission characteristics substantially definable by a plurality of mathematical functions for reproducing on light-sensitive material from one color reproduction of a scene other color reproductions thereof comprising: a source of light of composite color for illuminating the one reproduction to develop therefrom a resultant light of composite color which represents the scene but tends to deviate from a desired representation thereof by a degree determinable by means of the mathematical functions; a computer including a plurality of electro-optical transducer devices individually having different spectral response characteristics and responsive to said resultant light for individually developing from different spectral portions of said resultant light electrical signals individually representative of different component colors of said resultant light and including a plurality of signal-translating channels individually having signal transfer characteristics determined by individual ones of said mathematical functions for substantially simultaneously translating in individual ones of said channels different ones of said electrical signal and deriving therefrom electrical correction signals representative of the light correction needed in the photographic process to develop the other color reproductions so that they desirably represent the scene; and utilization apparatus coupled to said computer for employing said correction signals to effect such illumination of the light-sensitive material that the other reproductions developed therefrom desirably represent said scene.

6. A photographic color printer useful in a photographic process having color light-transmission characteristics substantially definable by a plurality of mathematical functions for reproducing on light-sensitive material from one color reproduction of a scene other color reproductions thereof comprising: a source of light of composite color for illuminating the one reproduction to develop therefrom a resultant light of composite color which represents the scene but tends to deviate from a desired representation thereof by a degree determinable by means of the mathematical functions; a computer including a plurality of photoelectric cells individually having different spectral response characteristics and responsive to said resultant light for individually developing from different spectral portions of said resultant light electrical signals individually representative of different component colors of said resultant light and including a plurality of signal-translating channels individually coupled to different ones of said cells and individually having signal transfer characteristics determined by individual ones of said mathematical functions for substantially simultaneously translating in individual ones of said channels different ones of said electrical signals and deriving therefrom electrical correction signals representative of the light correction needed in the photographic process to develop the other color reproductions so that they desirably represent the same; and utilization apparatus coupled to said computer for employing said correction signals to effect such illumination of the light-sensitive material that the other reproductions developed therefrom desirably represent said scene.

7. A photographic color printer useful in a photographic process having color light-transmission characteristics substantially definable by a plurality of mathematical functions for reproducing on light-sensitive material from one color reproduction of a scene other color reproductions thereof comprising: a cathode-ray tube for developing a moving beam of white light for illuminating the one reproduction to develop therefrom a moving beam of resultant color light simultaneously including at least two primary colors of said photographic process which represents the scene but tends to deviate from a desired representation thereof by a degree determinable by means of the mathematical functions; a computer including a plurality of photoelectric cells individually having different spectral response characteristics and responsive to said resultant light for individually developing from different spectral portions of said resultant light electrical signals individually representative of different component colors of said resultant light and including a plurality of signal-translating channels individually coupled to different ones of said cells and individually having signal transfer characteristics determined by individual ones of said mathematical functions for substantially simultaneously translating in individual ones of said channels different ones of said electrical signals and deriving therefrom electrical correction signals representative of the light correction needed in the photographic process to develop the other color reproductions so that they desirably represent the scene; and utilization apparatus coupled to said computer for employing said correction signals to effect such illumination of the light-sensitive material that the other reproductions developed therefrom desirably represent said scene.

8. A photographic color printer useful in a photographic process having color light-transmission characteristics for the primary colors of said process substantially definable by a mathematical function for each of the primary colors for reproducing on light-sensitive material from one color reproduction of a scene other color reproductions thereof comprising: a source of light of composite color for illuminating the one reproduction to develop therefrom a resultant light of composite color which represents the scene but the light densities of the primary color lights thereof tend to deviate from light densities thereof which comprises a desired representation of the scene by degrees determinable by means of the mathematical functions; a computer including electro-optical transducer apparatus coupled to said source and responsive to said resultant light for substantially simultaneously developing therefrom a plurality of electrical signals individually representative of the photographic light densities of said different primary color lights and including a plurality of signal-translating channels for substantially simultaneously translating in individual ones thereof different ones of said electrical signals, at least some of said channels including signal-combining apparatus for individually combining portions of said signals in different proportions defined by different ones of said mathematical functions for deriving from said signals electrical correction signals representative of the light correction needed in the photographic process to develop the other color reproductions so that they desirably represent the scene; and utilization apparatus coupled to said computer for employing said correction signals to effect such illumination of the light-sensitive material that the other reproductions developed therefrom desirably represent said scene.

9. A photographic color printer useful in a trichromatic photographic process utilizing three different color dyes desirably individually responsive only to different ones of three color lights but in which at least some of the dyes undesirably respond to more than one of the color lights comprising: a source of substantially white light for illuminating a color reproduction including the dyes to develop therefrom a resultant light including three color lights which represents the scene but tends to deviate from desirable representation thereof by the degree to which the light densities of the resultant three color lights are individually distorted by the undesirable responses of said dyes; a computer including electro-optical transducer apparatus coupled to said source and responsive to said resultant light for substantially simultaneously developing therefrom three electrical signals individually representative of the light densities of different ones of said resultant three color lights and including three signal-translating channels for substantially simultaneously translating individual ones of said electrical signals in individual ones thereof and individually having signal transfer characteristics proportional to the degree to which different ones of the resultant three color lights individually represented by the different electrical signals are distorted by the undesirable responses of the dyes thereto for developing electrical correction signals representative of light components of a composite light which is substantially complementary to the light distortion of said resultant light; and utilization apparatus coupled to said computer for employing said correction signals to compensate for said light distortion of said resultant light thereby to effect such illumination by said corrected resultant light of light-sensitive material that reproductions developed therefrom desirably represent said scene.

10. A photographic color printer useful in a trichromatic photographic process utilizing three different color dyes desirably individually responsive only to different ones of three color lights but in which at least some of the dyes undesirably respond to more than one of the color lights comprising: a source of substantially white light for illuminating a color reproduction including the dyes to develop therefrom a resultant light including three color lights which represents the scene but tends to deviate from desired representation thereof by the degree to which the light densities of the resultant three color lights are individually distorted by the undesirable responses of said dyes; a computer including electro-optical transducer apparatus coupled to said source and responsive to said resultant light for substantially simultaneously developing therefrom three electrical signals individually representative of the light densities of different ones of said resultant three color lights and including three signal-translating channels for substantially simultaneously translating individual ones of said electrical signals in individual ones thereof and at least some of said channels including signal-combining apparatus for individually combining portions of said signals in different proportions complementary to the magnitudes of said undesirable responses of said dyes for developing electrical correction signals representative of light components of a composite light which is substantially complementary to the light distortion of said resultant light; and utilization apparatus coupled to said computer for employing said correction signals to compensate for said light distortion of said resultant light thereby to effect such illumination by said corrected resultant light of light-sensitive material that reproductions developed therefrom desirably represent said scene.

11. A photographic color printer useful in a trichromatic photographic process utilizing three different color dyes desirably individually responsive only to different ones of three color lights but in which at least some of the dyes undesirably respond to more than one of the color lights comprising: a source of substantially white light for illuminating a color reproduction including the dyes to develop therefrom a resultant light including three color lights which represents the scene but tends to deviate from desired representation thereof by the degree to which the light densities of the resultant three color lights are individually distorted by the undesirable responses of said dyes; a computer including electro-optical transducer apparatus coupled to said source and responsive to said resultant light for substantially simultaneously developing therefrom three electrical signals individually representative of the light densities of different ones of said resultant three color lights and including three signal-translating channels for substantially simultaneously translating individual ones of said electrical signals in individual ones thereof and including signal-combining apparatus for combining a component of one of said signals representative of the density of picture elements of said color reproduction to one of said color lights with at least a component of another of said signals proportional to the density of said picture elements to another of said color lights for developing electrical correction signals representative of light components of a composite light which is substantially complementary to the light distortion of said resultant light; and utilization apparatus coupled to said computer for employing said correction signals to compensate for said light distortion of said resultant light thereby to effect such illumination by said corrected resultant light of light-sensitive material that reproductions developed therefrom desirably represents said scene.

12. A photographical color printer useful in a trichromatic photographic process utilizing three different color dyes desirably individually responsive only to different ones of three color lights but in which at least some of the dyes undesirably respond to more than one of the color lights comprising: a source of substantially white light for illuminating a color reproduction including the dyes to develop therefrom a resultant light including three color lights which represents the scene but tends to deviate from desired representation thereof by the degree to which the light densities of the resultant three color lights are individually distorted by the undesirable responses of said dyes; a computer including electro-optical transducer apparatus coupled to said source and responsive to said resultant light for developing therefrom three electrical signals individually representative of the light densities of different ones of said resultant three color lights and including three signal-translating channels for substantially simultaneously translating individual ones of said electrical signals in individual different ones thereof and including signal-combining apparatus for individually combining portions of said signals in different proportions complementary to the magnitudes of said undesirable responses of said dyes for developing electrical correction signals in each of said channels individually representative of the light densities of masked separation negative for different ones of said resultant color lights; and utilization apparatus coupled to said computer for employing said correction signals to compensate for said light distortion of said resultant light thereby to effect such illumination by said corrected resultant light of light-sensitive material that reproductions developed therefrom desirably represent said scene.

13. A photographic color printer useful in a photographic process having color light-transmission characteristics substantially definable by a plurality of mathematical functions for reproducing on light-sensitive material from one color reproduction of a scene other color reproductions thereof comprising: a cathode-ray tube including an image screen, means for developing a moving spot of substantially white light for scanning a raster on said screen, and a control electrode for controlling the intensity of the light emitted by said spot; means for supporting said one color reproduction of a scene and a light-sensitive material spaced therefrom in front of said screen; means for projecting said raster on the color reproduction to develop therefrom a resultant light of composite color including at least two primary colors of said photographic process which represents the scene but tends to deviate from a desired representation thereof by a degree determinable by means of the mathematical functions; electro-optical apparatus including a plurality of electro-optical devices each having a different spectral response characteristic; means for directing said resultant light onto said electro-optical apparatus for causing said devices individually and substantially simultaneously to develop from different spectral portions of said resultant light potentials individually representative of the photographic densities of different ones thereof; a plurality of signal-translating channels individually coupled to different ones of said devices and individually responsive to different ones of said potentials for substantially simultaneously translating in individual ones of said channels different ones of said potentials for modifying said potentials in accordance with the terms of the mathematical functions to correct for errors in said photographic densities caused by said color light-transmission characteristics; means for applying said modified potentials to said control electrode of said cathode-ray tube to control the intensity of said emitted spot of light in a manner complementary to the light errors caused by said light-transmission characteristics and defined by said mathematical functions; and means for causing said modified emitted light to impinge on said light-sensitive material to cause other photographic reproductions developed from said material desirably to represent said scene.

14. A photographic color printer useful in a photographic process having color light-transmission characteristics for the primary colors thereof for reproducing on light-sensitive material from a color transparency of a scene by means of the primary colors other color reproductions thereof comprising: a cathode-ray tube including an image screen, means for developing a moving spot of substantially white light for scanning a raster on said screen, and a control electrode for controlling the intensity of the light emitted by said spot; means for supporting said transparency and a light-sensitive material spaced therefrom in front of said screen; means for projecting said raster on the transparency to develop from the light emerging therefrom a resultant light of composite color including at least two of said primary colors which represents the scene but tends to deviate from a desired representation thereof by a degree determinable by the color light-transmission characteristics; electro-optical apparatus including a plurality of electro-optical devices individually having different spectral response characteristics corresponding to different ones of said primary colors; means for directing said resultant light onto said electro-optical apparatus for causing said devices individually and substantially simultaneously to develop from different ones of the primary color lights of said resultant light potentials representative of the photographic densities thereof; a plurality of signal-translating channels individually coupled to different ones of said devices and individually responsive to different ones of said potentials for substantially simultaneously translating in individual ones of said channels different ones of said potentials for modifying at least a potential representative of the density of elements of the transparency to light of one primary color by a potential proportional to the density of said elements to light of another primary color to correct for errors in said photographic densities caused by the color light-transmission characteristics; means for applying said modified potentials to said control electrode of said cathode-ray tube to control the intensity of said emitted spot of light in a manner complementary to the light errors caused by said color light-transmission characteristics; and means for causing said modified emitted light to impinge on said light-sensitive material to cause other photographic reproductions developed from said material desirably to represent said scene.

15. A photographic color printer useful in a photographic process having color light-transmission characteristics substantially definable by a plurality of mathematical functions for reproducing on light-sensitive material from one color reproduction of a scene other color reproductions thereof comprising: a cathode-ray tube including an image screen and means for developing a moving spot of substantially white light for scanning a raster on said screen; means for supporting said one color reproduction of a scene in front of said screen; means for projecting said raster on the color reproduction to develop therefrom a resultant light of composite color including at least two primary colors of said photographic process which represents the scene but tends to deviate from a desired representation thereof by a degree determinable by means of the mathematical functions; electro-optical apparatus including a plurality of electro-optical devices each having a different spectral response characteristic; means for directing said resultant light onto said electro-optical apparatus for causing said devices individually and substantially simultaneously to develop from different spectral portions of said resultant light potentials representative of the photographic densities thereof; a plurality of signal-translating channels individually coupled to different ones of said devices and individually responsive to different ones of said potentials for substantially simultaneously translating in individual ones of said channels different ones of said potentials for modifying said potentials in accordance with the terms of the mathematical functions to correct for errors in said photographic densities caused by said color light-transmission characteristics; another cathode-ray tube including an image screen, means for developing a moving spot of substantially white light for scanning a raster on said last-mentioned screen, and a control electrode for controlling the intensity of the light emitted by said last-mentioned spot; means for applying said modified potentials to said control electrode to control the intensity of said last-mentioned emitted spot of light in a manner complementary to the light errors caused by said color light-transmission characteristics and defined by said mathematical functions; means for supporting a copy of said one color reproduction and light-sensitive material in front of said last-mentioned screen; and means for causing said modified emitted light to form an image of said copy of said reproduction on said light-sensitive material to cause other photographic reproductions developed from said material desirably to represent said scene.

16. A photographic color printer useful in a photographic process having color light-transmission characteristics substantially definable by a plurality of mathematical functions and for reproducing on light-sensitive material from one color reproduction of a scene other color reproductions thereof comprising: a cathode-ray tube including an image screen, means for developing a spot of substantially white-light deflection means for causing said spot of light to scan a raster on said screen, and a control electrode for controlling the intensity of the light emitted by said spot; means for supporting said one color reproduction of a scene and a light-sensitive material spaced therefrom in front of said screen; means for projecting said raster on the color reproduction to develop therefrom a resultant light of composite color including at least two primary colors of said photographic process which represents the scene but tends to deviate from a desired representation thereof by a degree determinable by means of the mathematical functions; electro-optical apparatus including a plurality of electro-optical devices each having a different spectral response characteristic; means for directing said resultant light onto said electro-optical apparatus for causing said devices individually and substantially simultaneously to develop from different spectral portions of said resultant light potentials representative of the photographic densities thereof; a plurality of signal-translating channels individually coupled to different ones of said devices and individually responsive to different ones of said potentials for substantially simultaneously translating in individual ones of said channels different ones of said potentials for modifying said potentials in accordance with the terms of the mathematical functions to correct for errors in said photographic densities caused by said color light-transmission characteristics and including means for developing a control signal representative of the brightness of said color reproduction; means for applying said modified potentials to said control electrode of said cathode-ray tube to control the intensity of said emitted spot of light in a manner complementary to the light errors caused by said color light-transmission characteristics and defined by said mathematical functions; means for applying said control signal to said deflection means to control the rate of deflection of said spot with respect to said brightness of said color reproduction; and means for causing said modified emitted light to impinge on said light-sensitive material to cause other photographic reproductions developed from said material desirably to represent said scene.

17. A photographic color printer useful in a trichromatic photographic process utilizing cyan, magenta, and yellow dyes desirably individually responsive only to red, green, and blue lights, respectively, but in which at least some of the dyes undesirably respond to more than one of the color lights comprising: a source of substantially white light for illuminating a color reproduction including the dyes to develop therefrom a resultant light including said three color lights which represents the scene but tends to deviate from desired representation thereof by the degree to which the light densities of the resultant three color lights are individually distorted by the undesirable responses of said dyes; a computer including electro-optical transducer apparatus coupled to said source and responsive to said resultant light for developing therefrom three electrical signals $D_{OR}$, $D_{OG}$, and $D_{OB}$ representative of the light densities of said resultant three color lights, red, green, and blue, respectively, and including three signal-translating channels for substantially simultaneously translating individual ones of said electrical signals in individual ones thereof, the one of said channels for translating said signal $D_{OR}$ including an attenuation circuit and a phase inverter for developing a correction signal $M_R$ substantially equal to $-D_{OR}/3$, the ones of said channels for translating said signal $D_{OG}$ including signal-combining apparatus coupled to the other two of said channels and attenuation circuits for developing a correction signal $M_G$ substantially equal to $$-.372D_{OR} + .269D_{OG} - .318D_{OB}$$

and the one of said channels for translating said signal $D_{OB}$ including signal-combining apparatus coupled to the other two of said channels and attenuation circuits for developing a correction signal $M_B$ substantially equal to $$-.285D_{OR} - .95D_{OG} + 90D_{OB}$$

said correction signals $M_R$, $M_G$, and $M_B$ being representative of color light components of a composite light which is substantially complementary to the light distortion of said resultant light; and utilization apparatus coupled to said computer for employing said correction signals to compensate for said light distortion of said resultant light thereby to effect such illumination by said corrected resultant light of light-sensitive material that reproductions developed therefrom desirably represent said scene.

References Cited in the file of this patent
UNITED STATES PATENTS
2,565,399    Simmon ---------------- Aug. 21, 1951